US009506490B2

(12) United States Patent  
Scheerer (10) Patent No.: US 9,506,490 B2
(45) Date of Patent: Nov. 29, 2016

(54) ANTI-BURR FASTENER (71) Applicant: SFS intec Holding AG, Heerbrugg (CH)

(72) Inventor: Daniel Scheerer, Wyomissing, PA (US)

(73) Assignee: SFS intec Holding AG, Heerbrugg (CH)

( * ) Notice: Subject to any disclaimer, the term of this patent is extended or adjusted under 35 U.S.C. 154(b) by 80 days.

(21) Appl. No.: 14/499,678

(22) Filed: Sep. 29, 2014

(65) Prior Publication Data

US 2015/0093213 A1    Apr. 2, 2015

Related U.S. Application Data

(60) Provisional application No. 61/885,579, filed on Oct. 2, 2013.

(51) Int. Cl.
*F16B 35/04* (2006.01)
*F16B 25/00* (2006.01)
*F16B 25/10* (2006.01)

(52) U.S. Cl.
CPC ....... *F16B 25/0021* (2013.01); *F16B 25/0084* (2013.01); *F16B 25/103* (2013.01)

(58) Field of Classification Search
CPC ............ F16B 25/0021; F16B 25/0084; F16B 25/103; F16B 35/04
USPC ............. 411/387.8, 411, 418, 421, 424, 386, 411/387.1, 387.7; 29/2.11, 38 A; 409/132; 470/8, 9, 10, 66

See application file for complete search history.

(56) References Cited

U.S. PATENT DOCUMENTS

| 66,354 | A | * | 7/1867 | Keables | ................... | B23C 5/08 144/218 |
| 866,372 | A | * | 9/1907 | Maltby | ................. | B23C 5/2455 246/406 |
| 2,403,359 | A | * | 7/1946 | Gerhold | ................... | B65H 5/22 408/219 |
| 2,956,470 | A | * | 10/1960 | Knohl | ................. | F16B 25/0021 411/387.2 |
| 3,136,205 | A | * | 6/1964 | Ansingh | ............. | F16B 25/0015 411/387.7 |
| 3,463,045 | A | * | 8/1969 | Prescott | ................... | B21K 1/56 411/387.8 |
| 3,710,676 | A | * | 1/1973 | Ringland | ............ | F16B 25/0021 411/387.7 |
| 4,697,969 | A | * | 10/1987 | Sparkes | .............. | F16B 25/0015 411/387.7 |
| 4,781,506 | A |  | 11/1988 | Roberts et al. | | |
| 5,120,172 | A | * | 6/1992 | Wakai | ................... | F16B 25/103 411/387.8 |
| 5,199,839 | A | * | 4/1993 | DeHaitre | ............ | F16B 23/0076 411/387.3 |
| 5,667,348 | A | * | 9/1997 | Chen | ................... | F16B 25/0078 411/418 |
| 6,015,252 | A | * | 1/2000 | Peck | ................... | F16B 25/0021 411/387.1 |

(Continued)

FOREIGN PATENT DOCUMENTS

| CN | 2929298 | 8/2007 |
| GB | 617321 | 2/1949 |
| KR | 20120129100 | 11/2012 |

OTHER PUBLICATIONS http://www.fastenerdimensions.com/screw_points.html, admitted prior art, Sep. 18, 2013.

(Continued)

*Primary Examiner* — Roberta Delisle
(74) *Attorney, Agent, or Firm* — Volpe and Koenig, P.C.

(57) ABSTRACT

A fastener includes a cylindrical shaft located between a head and a tapered point, threads integrally extending from the shaft and extending along a portion of a length thereof, and a burr cutoff area near the tapered point and including flank surfaces therein forming an angle greater than 90° therebetween. A flattened area can be located between the flank surfaces.

10 Claims, 7 Drawing Sheets

(56) References Cited

U.S. PATENT DOCUMENTS

| | | | | |
|---|---|---|---|---|
| 6,065,919 A | * | 5/2000 | Peck | F16B 25/0021 411/387.1 |
| 6,086,302 A | | 7/2000 | Gerhard | |
| 6,874,986 B2 | * | 4/2005 | Koppel | F16B 25/0094 411/386 |
| 2002/0168245 A1 | * | 11/2002 | Kuo-Tai | F16B 25/0015 411/387.1 |
| 2003/0082027 A1 | * | 5/2003 | Lin | F16B 25/0015 411/387.1 |
| 2004/0096293 A1 | * | 5/2004 | Tadich | F16B 25/0031 411/387.8 |
| 2005/0276676 A1 | * | 12/2005 | Mardinger | A61C 8/0022 411/411 |
| 2007/0286701 A1 | | 12/2007 | Hsu | |

OTHER PUBLICATIONS http://shehfung.manufacturer.globalsources.com/si/6007000373022/pdtl/Screw/1031397434/Screw.html, admitted prior art, Sep. 16, 2013.

\* cited by examiner

ANTI-BURR FASTENER

BACKGROUND

Fasteners, particularly screw type fasteners drive through and/or into two objects, securing them to one another. In sheet metal applications, screw threads may cut into the sheet metal, creating a pigtail-looking burr that is not only sharp and dangerous, but may compromise the integrity of the screw attachment and the sheet metal itself due to the burr damaging the sealing washer typically provided under the screw head, resulting in a defective water seal.

Figure 23:
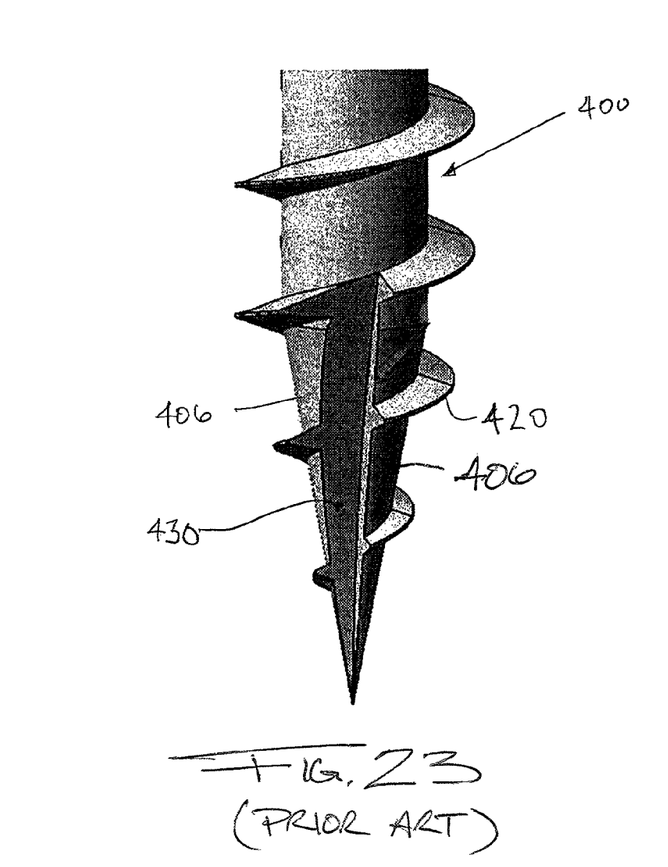
FIG. 23 is a partial side view enlargement of a screw according to the known prior art.
Figure 24:
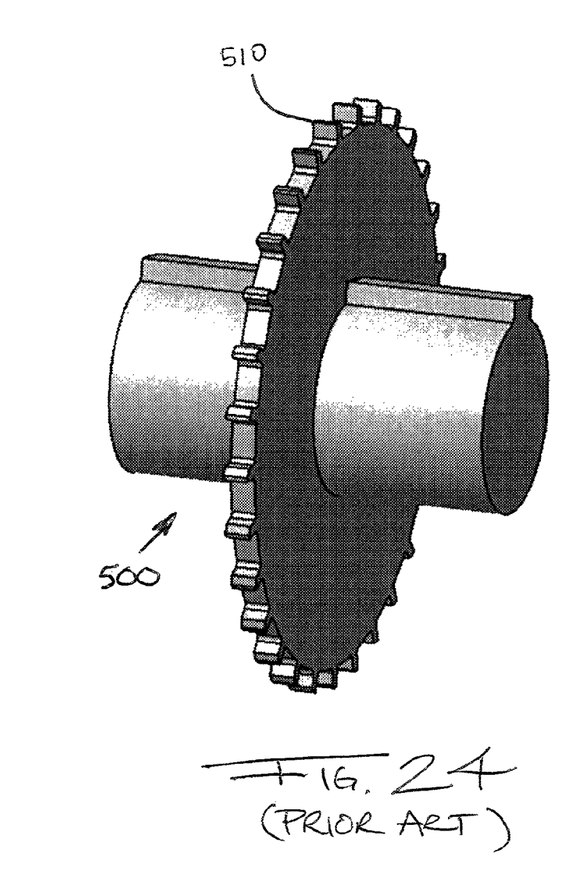
FIG. 24 is a view of a milling cutter form forming the cutoff area of the prior art screw of FIG. 23.

Previous methods for preventing screws from forming pigtail burrs include mill-cutting the screw-tip. The prior known milled point screws are generally referred to as a "Type 17" point screw, an example 400 of which is shown in FIG. 23. Here a tip 406 of the screw 400 has a cut area 430 that is cut into a screw tip 406 and threads 420 using a standard right angle milling cutter 500, shown in FIG. 24, with generally right-angled teeth 510. Such a standard cutter may be 3" in diameter and ⅛" thick. When the cutter 500 cuts into the screw 400, a right angle is created in the screw tip 406 and the cut through the threads 420 is similarly at a right angle. This sharp angled cut area 430 helps to break off burrs that form during screw insertion. These screws include a cutting edge milled with a 90° cutter, shown in FIG. 24. One side of the cutter is can be aligned with the fastener centerline so that the cutting face created is perpendicular. However, installation of these types of fasteners does not consistently result in a burr not being formed.

SUMMARY

A fastener includes a cylindrical shaft located between a head and a tapered point, threads integrally extending from the shaft and extending along a portion of a length thereof, and a burr cutoff area formed in the shaft near the tapered point and including flank surfaces therein forming an angle α of more than 90 degrees therebetween, and a flattened area between the flank surfaces. This is referred to by applicant as a beveled milled point and applicant has shown that this arrangement reduces the installation torque required due to the reduced surface area of the thread near the point as well as the increased cutting performance due to the beveled point surfaces and also addresses the issue in the prior known milled point fasteners.

In one aspect, the angle α is from at least 90° to 145°, and more preferably about 105°.

In one preferred arrangement, a sealing washer located on the shaft under the head.

In one embodiment, the flank surfaces are arranged at an angle of α/2 from a center of the cutoff area, with the cutoff area being symmetric in cross-section.

Alternatively, a first one of the flank surfaces can be arranged at an angle $\alpha_1$ of about 90° from the flattened area, and a second one of the flank surfaces is arranged at an angle $\alpha_2$ of about 5° to 50° to the flattened area, more preferably at about 45°.

Here, the second one of the flank surfaces preferably faces in an advancing direction of the thread.

In another aspect, a method of forming an anti-burr-forming fastener is provided, which includes the steps of providing a rotating cutting tool with a cutting surface including, in cross-section, two sides set at an angle of greater than 90° to each other, connected by a flat portion; and applying the cutting surface to a screw in an area adjacent to a tip of the screw, cutting a groove generally parallel to an axis of the screw forming a cutoff area with two flank surfaces at an angle of greater than 90° to each other connected by a flattened area.

In one preferred arrangement, one of the two sides of the cutting tool is arranged at an angle of about 90° to the flat portion.

Alternatively, the two sides of the cutting tool can be arranged at equal angles to the flat portion.

DETAILED DESCRIPTION OF THE PREFERRED EMBODIMENTS

FIGS. 1-7 show a first embodiment of a screw 100 described herein. The screw 100 comprises a shaft 102, head 104, point or tip 106, threads 120, and anti-burr cutoff area 130. (Although traditionally the plural is used to describe the "threads," a screw thread 120 is typically one helical connected inclined plane).

Figure 1:
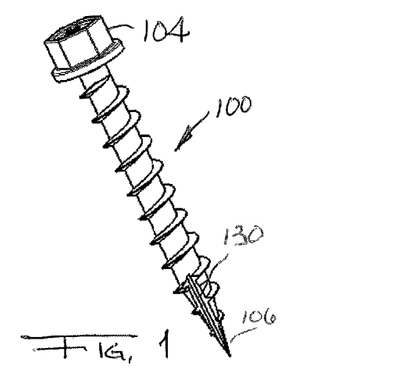
FIG. 1 is a perspective view of a first embodiment of a screw.
Figure 2:
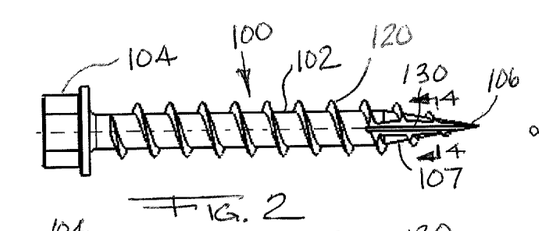
FIG. 2 is a side view of the screw of FIG. 1.
Figure 3:
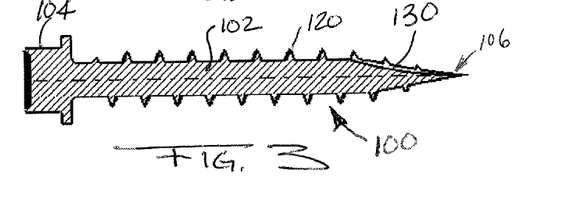
FIG. 3 is a cross-sectional view of the screw of FIG. 1.
Figure 4:
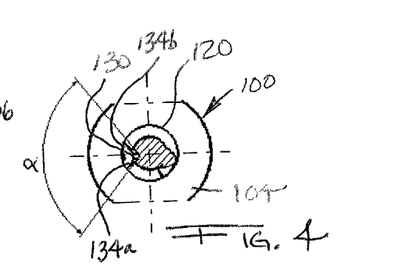
FIG. 4 is a cross-sectional view taken along line 4-4 in FIG. 1.

A screw 100 is one of the six classical simple machines, and combines the simple machines of an inclined plane and wedge. The threads 120 of the screw 100 are made of an inclined plane that encircles the cylindrical shaft 102. The threads 120 or planar inclination allows the screw 100 to fasten more easily and also improves the screw 100's holding power.

The screw tip 106 acts as a wedge that operates by separating objects. When used with the screw 100, the wedge tip 106 creates a hole in the material that the screw 100 engages. The sharper the tip 106, the less force it takes for it to create a hole.

Once the tip 106 creates a small hole, the threads 120 engage the material and drive it apart. The threads 120 may be wound into existing thread grooves within the previously created hole or they may cut their own grooves during insertion. A rotation force applied to the screw 100 drives the screw through the material. This force may be applied with a driving mechanism like a drill or screwdriver. The threads 120 resting within the grooves create a bind that joins materials engaged along the axis of the screw shaft 102. This engagement is the result of converting torque to linear force.

The strength of hold of the screw 100 depends on the width of the threads 120 and the distance between them. The closer and wider the threads 120, the stronger the hold will be. More threads, however, require more rotations to attach the screw 100, while wider threads 120 require more force in the rotations.

As shown, the screw threads 120 taper from their maximum height along the cylindrical shaft 102 along the conical screw portion 107 that leads to the tip 106. At the tip 106, the screw thread 120 height diminishes until it meets and/or forms the point.

Along the length of the screw shaft 102, the screw threads 120 maintain a constant height in most uses (although this is not necessary).

Figure 5:
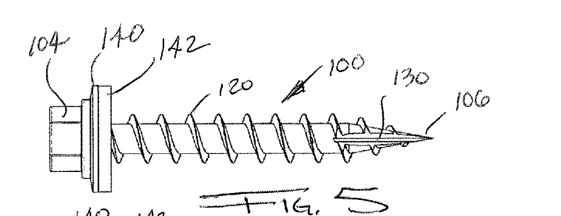
FIG. 5 is a side view of the screw of FIG. 1 shown with a sealing washer under the head.
Figure 6:
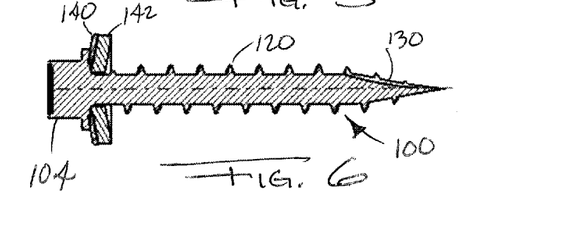
FIG. 6 is a cross-sectional view of the screw of FIG. 5.
Figure 7:
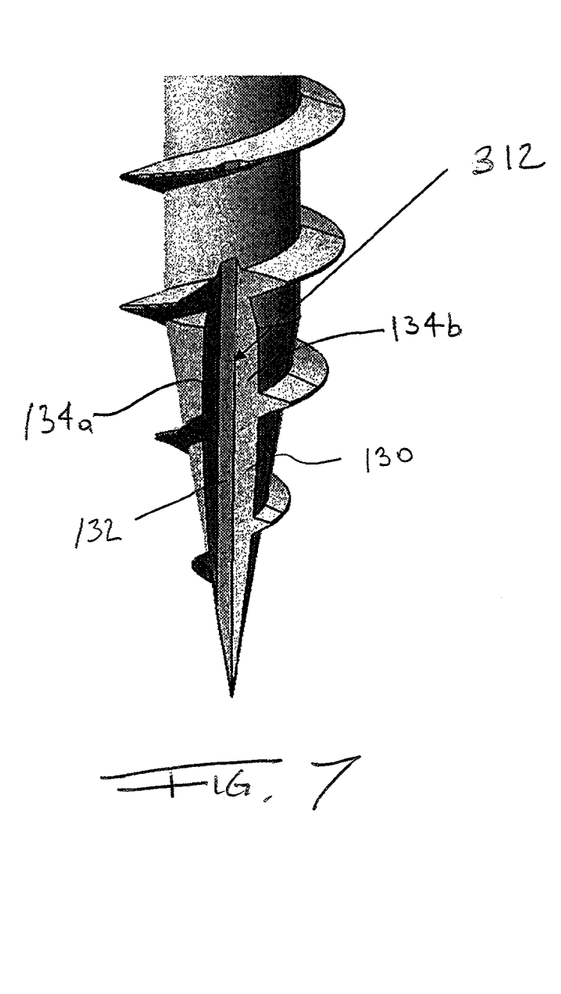
FIG. 7 is a partial side view enlargement of the screw of FIG. 1.

Depending on the application, the screw 100 may include one or more sealing washers installed under the head 104. One preferred arrangement used for sheet metal siding and roofing provides a two part bonded washer with a steel washer 140 that goes under the head 104 and a rubber or elastomer seal 142 that goes under and is preferably bonded or vulcanized to the steel washer 140 to provide sealing around the entry point of the screw 100 into the material being fastened. Alternatively, the washers 140, 142 could be two separate parts.

In the screw 100, a burr cutoff area 130 is provided having an overall angle α of at least 90° to 145°, and more preferably about 105°. The cutoff area 130 is formed with three surfaces, shown most clearly in FIG. 7, with two flank surfaces 134a, 134b that define the angle α therebetween that are connected by a bottom, flattened surface 132, shown as flat in cross-section in the present embodiment. Here the flank surfaces 134a, 134b are each at an angle of α/2 from a center of the cutoff area 130, forming a symmetric groove. This arrangement results in what applicant terms a "double bevel milled point" screw 100.

Figure 8:
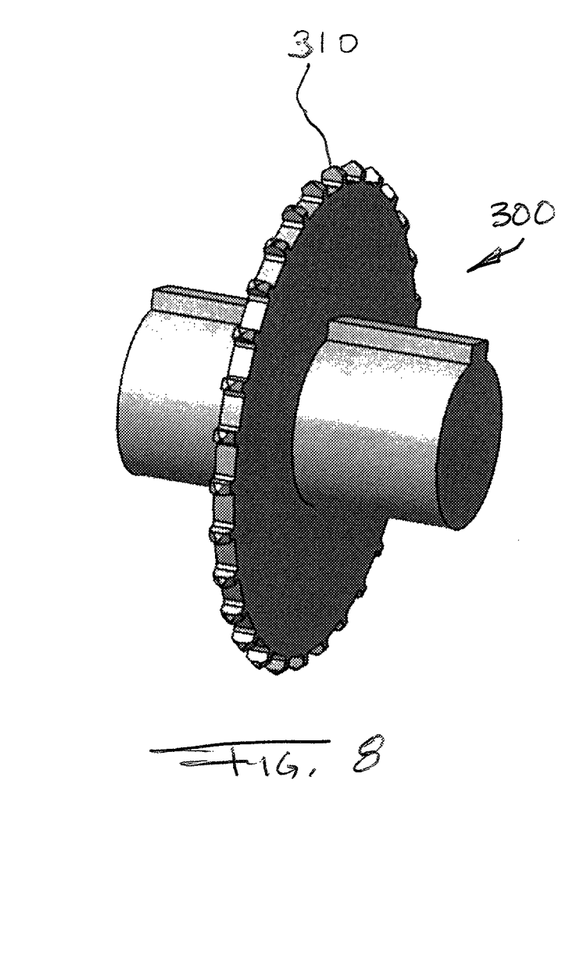
FIG. 8 is a view of a milling cutter form forming the cutoff area of the screw of FIG. 1 according to one embodiment of the invention.
Figure 9:
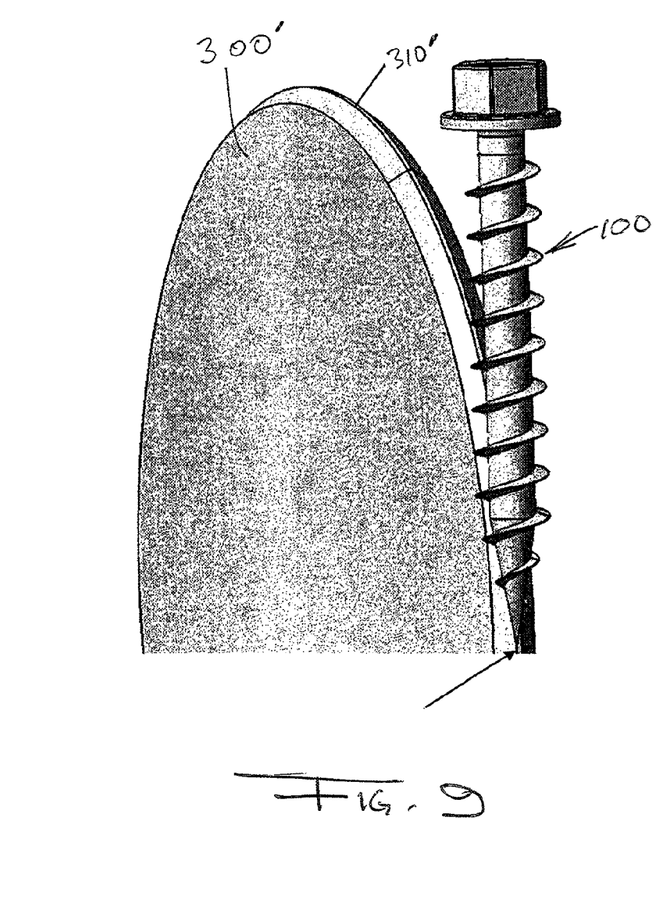
FIGS. 9 and 10 show a beveled grinding wheel being applied to as a part of the manufacturing process to form the cutoff area of the screw of FIG. 1.
Figure 10:
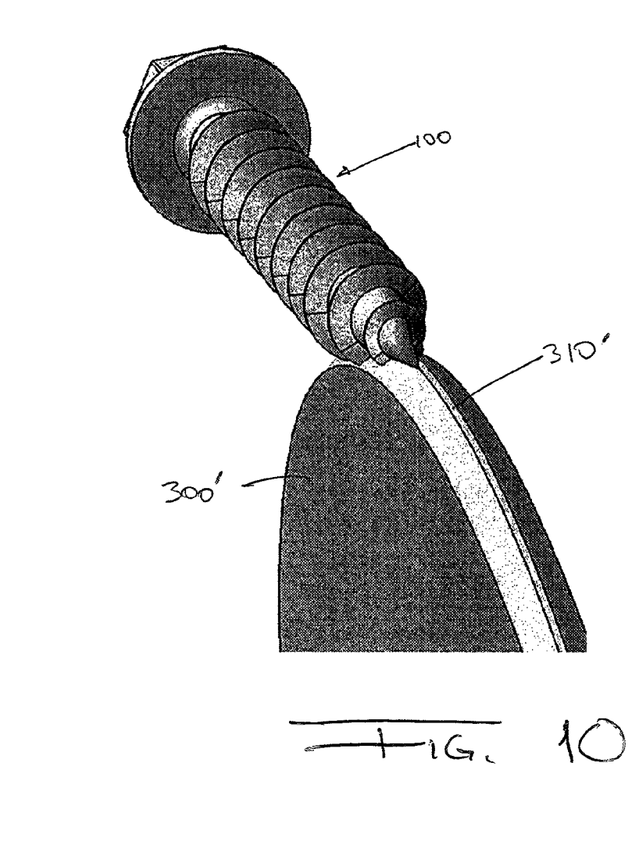
Figures 11, 12, 13:
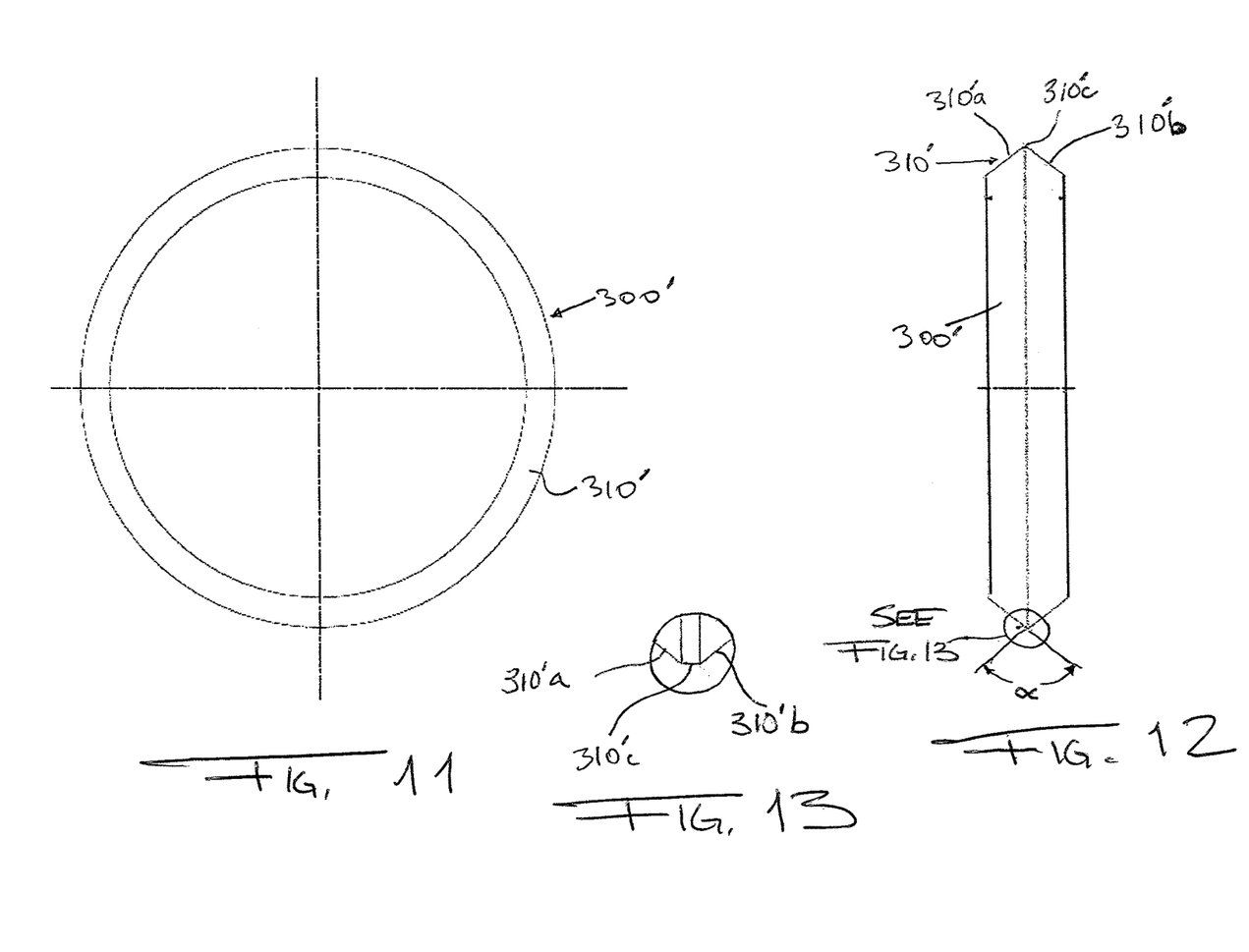
FIG. 11 shows a side view of the grinding wheel.
FIG. 12 shows a side view of the grinding wheel.
FIG. 13 shows an enlargement of the cutting surface of FIG. 12.

A beveled milling cutter 300 with teeth 310 that forms the cutoff area 130 in the screw 100 is shown in FIG. 8. The cutter 300 preferably has a 3" diameter and is ⅛" thick. The dimensions of the milling cutter could be varied depending on the particular application. Alternatively, FIGS. 9 and 10 show a beveled cutting wheel 300' formed as a grinding wheel, made of a cutting abrasive, or as a diamond coated surface with cutting surface 310' having the desired profile. In FIGS. 9 and 10, the cutter 300' is shown being applied to a screw 100. FIGS. 11-13 show the cutting wheel 300' and the feature that the angled cutting surfaces 310'a and 310'b are at an angle of 105° to each other and the flat surface 310'c is approximately 0.015 inches, as shown. The cutting surface 310'a is used to form the flank surface 134a, the cutting surface 310'b is used to form the flank surface 134b, and cutting surface 310'c forms the flat bottom of the burr cutoff area 130. The flat surface 310'c may be eliminated in some embodiments. The angle between surfaces 310'a and 310'b is preferably between 90 and 135 degrees. The teeth 310 on the cutting wheel 300 would have similar dimensions.

When the cutting wheel 300, 300' is applied to the screw 100, the center axis of the shaft 120 can be aligned with the leading edge of the flat surface 310'c. However, other positioning is possible, depending on the particular profile.

The reduced cross-sectional area of the point 106 reduces the chance of forming pig tail burrs so that sealing washers put onto the screw 100 are less likely to become damaged (especially the rubber washers 142). The anti-burr area 130 helps break off the burr when it does form, yields a larger cutting surface, and helps make a sharper drill point.

Figures 14, 17, 18, 19:
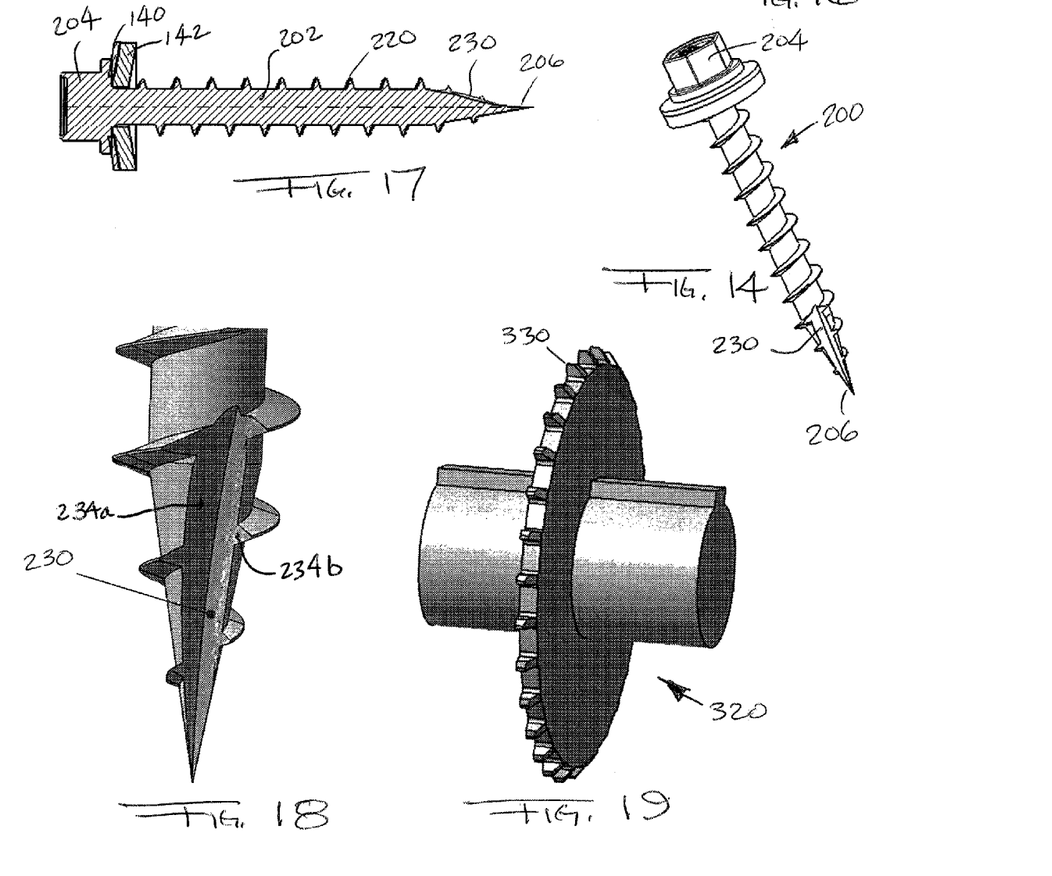
FIG. 14 is a perspective view of a second embodiment of a screw.
FIG. 17 is a cross-sectional view taken along line 17-17 in FIG. 14.
FIG. 18 is a partial side view enlargement of the screw of FIG. 14.
FIG. 19 is a view of a milling cutter form forming the cutoff area of the screw of FIG. 14 according to one embodiment of the invention.
Figure 15:
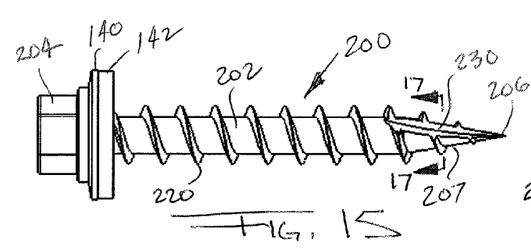
FIG. 15 is a side view of the screw of FIG. 14.
Figure 16:
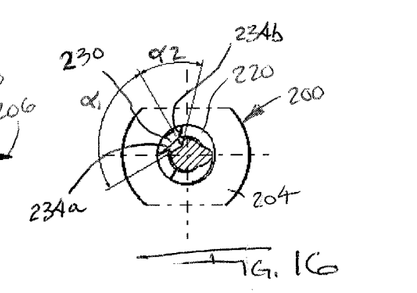
FIG. 16 is a cross-sectional view of the screw of FIG. 14.

Referring now to FIGS. 14-17, a second embodiment of a screw 200 is shown. The second embodiment of the screw 200 is similar to the first embodiment 100, and like elements have been designated with similar reference numbers that are increased by 100. The screw 200 includes the shaft 202, a head 204 and a point 206, as well as threads 220. The screw threads 220 taper from their maximum height along the cylindrical shaft 202 along the conical screw portion 207 that leads to the tip 206. As shown in FIGS. 14, 15, and 17, the screw 200 can also be provided with the sealing washers 140, 142 under the head 204. The difference between the screw 100 and the screw 200 is in the burr cutoff area 230. As shown in FIGS. 16 and 18, the first flank surface 234a is at an angle $\alpha_1$ of about 90° from a radially extending line that extends from the bottom of the cutoff area 230, and the second flank surface 234b is at an angle $\alpha_2$ that is from about 5° to 50° from the radial line, and more preferably about 45°. Preferably $\alpha_1 + \alpha_2$=between about 95° and 140°, and more preferably 135°. $\alpha_2$ can be varied, and $\alpha_1$ remains at about 90°. The second flank surface 234b faces in an advancing direction of the thread 220. A flat can optionally be provided at the bottom of the first and second flank surfaces 234a, 234b. This arrangement results in what applicant terms a "hybrid single bevel milled point screw" 200.

Figure 20:
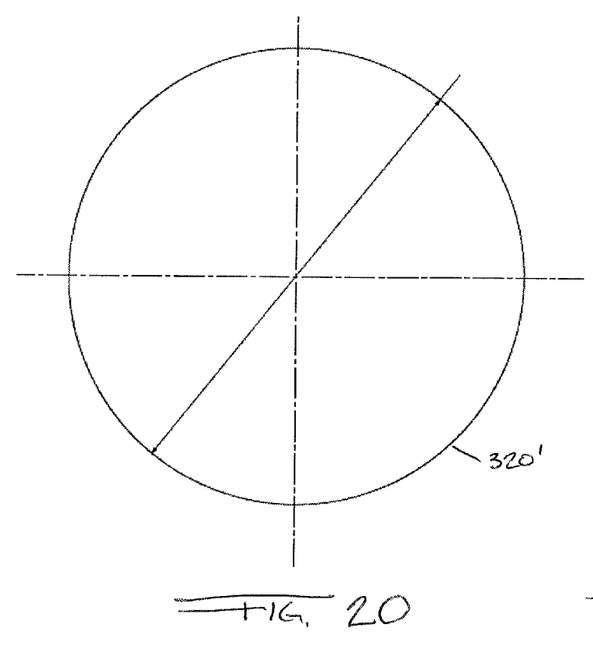
FIG. 20 shows a side view of the grinding wheel.
Figure 21:
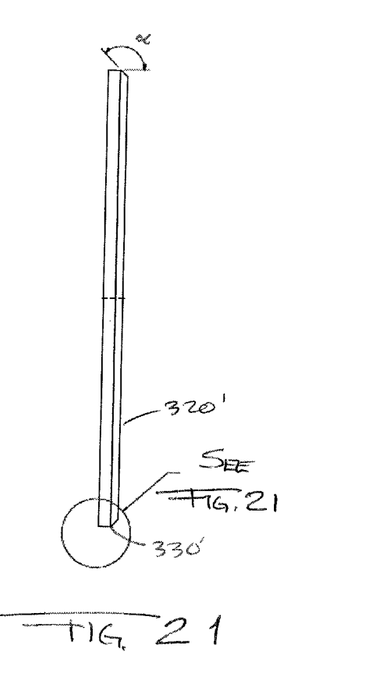
FIG. 21 shows a side view of the grinding wheel.
Figure 22:
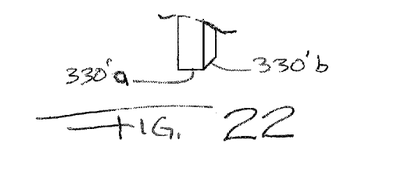
FIG. 22 shows an enlargement of the cutting surface of FIG. 21.

A beveled milling cutter 320 with teeth 330 that forms the cutoff area 230 in the screw 200 is shown in FIG. 19. The cutter 320 preferably has a 3" diameter and is ⅛" thick. The dimensions of the milling cutter could be varied depending on the particular application. Alternatively, FIGS. 20-22 show a beveled cutting wheel 320' formed as a grinding wheel, made of a cutting abrasive, or as a diamond coated surface with cutting surface 330' having the desired profile. Here cutting surface 330'a is used to form the flank surface 234a, cutting surface 330'b is used to form the flank surface 234b.

The reduced cross-sectional area of the point 206 reduces the chance of forming pig tail burrs so that sealing washers put onto the screw 200 are less likely to become damaged (especially the rubber washers 142).

Having thus described various embodiments of the present anti burr fasteners in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A fastener comprising:
   a shaft, a head located at a first end of the shaft, and a tapered point located at an opposite end of the shaft;
   threads integrally extending from the shaft and extending along a portion of a length thereof; and
   a burr cutoff area formed in the shaft adjacent to the tapered point, the burr cutoff area including flank surfaces forming an angle α of greater than 90° therebetween; and
   a flattened area located between the flank surfaces.

2. The fastener of claim 1, wherein α is from at least 90° to 145°.

3. The fastener of claim 1, further comprising a sealing washer located on the shaft under the head.

4. The fastener of claim 1, wherein the flank surfaces are arranged at an angle of α/2 from a center line that extends radially from the shaft through a center of the cutoff area.

5. A fastener comprising:
   a shaft, a head located at a first end of the shaft, and a tapered point located at an opposite end of the shaft;
   threads integrally extending from the shaft and extending along a portion of a length thereof;
   a burr cutoff area formed in the shaft adjacent to the tapered point, the burr cutoff area including flank surfaces forming an angle α of greater than 90° therebetween; and
   a first one of the flank surfaces is arranged at an angle $α_1$ of about 90° from a radial line extending from the shaft through a bottom of the burr cutoff area, and a second one of the flank surfaces is arranged at an angle $α_2$ of about 5° to 50° from the radial line.

6. The fastener of claim 5, wherein the angle $α_2$ is about 45°.

7. A fastener of claim 5, wherein the second one of the flank surfaces faces in an advancing direction of the thread.

8. A method of forming an anti-burr-forming fastener comprising:
   providing a rotating cutting tool with a cutting surface including, in cross-section, two sides set at an angle of greater than 90° to each other that are connected by a flat portion;
   applying the cutting surface to a screw in an area adjacent to a tip of the screw, cutting a groove generally parallel to an axis of the screw forming a cutoff area with two flank surfaces at an angle of greater than 90° to each other connected by a flattened area.

9. The method of claim 8, wherein the two sides are arranged at equal angles to the flat portion.

10. A method of forming an anti-burr-forming fastener comprising:
    providing a rotating cutting tool with a cutting surface including, in cross-section, two sides set at an angle of greater than 90° to each other,
    applying the cutting surface to a screw in an area adjacent to a tip of the screw, cutting a groove generally parallel to an axis of the screw forming a cutoff area with two flank surfaces at an angle of greater than 90°, with one of the two sides being arranged at an angle $α_1$ of about 90° to a radial line extending from the shaft through a bottom of the groove, and a second one of the two sides is arranged at an angle $α_2$ of about 5° to 50° from the radial line.

* * * * *